(12) United States Patent
Kusch (10) Patent No.: US 12,325,315 B2
(45) Date of Patent: Jun. 10, 2025

(54) TRACTION NETWORK FOR A MOTOR VEHICLE

(71) Applicant: Volkswagen Aktiengesellschaft, Wolfsburg (DE)

(72) Inventor: Rüdiger Kusch, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 277 days.

(21) Appl. No.: 18/174,850

(22) Filed: Feb. 27, 2023

(65) Prior Publication Data

US 2023/0278442 A1 Sep. 7, 2023

(30) Foreign Application Priority Data

Mar. 3, 2022 (DE) ...................... 10 2022 202 154.1

(51) Int. Cl.
| | | |
|---|---|---|
| *H02M 1/10* | (2006.01) | |
| *B60L 1/00* | (2006.01) | |
| *B60L 53/24* | (2019.01) | |
| *H02M 3/158* | (2006.01) | |

(Continued)

(52) U.S. Cl.
CPC ............. *B60L 53/24* (2019.02); *B60L 1/003* (2013.01); *H02M 3/33584* (2013.01); *H02M 7/487* (2013.01); *B60L 2210/12* (2013.01); *B60L 2210/14* (2013.01); *B60L 2210/30* (2013.01); *B60L 2210/40* (2013.01)

(58) Field of Classification Search
CPC ...... H02M 1/10; H02M 1/007; H02M 1/0077; H02M 3/1584; H02M 3/1582; H02M 7/487; H02M 3/158; H02M 1/4216; H02M 1/0074; H02M 3/33584; H02M 1/327; H02M 3/003; B60L 53/24; B60L 53/20; B60L 1/003; B60L 2210/14; B60L 2210/12; B60L 2210/10; B60L 2210/40; B60L 2210/30
USPC ......................................................... 318/139
See application file for complete search history.

(56) References Cited

U.S. PATENT DOCUMENTS

| | | |
|---|---|---|
| 9,878,622 B2 | 1/2018 | Jang et al. |
| 11,072,253 B2 | 7/2021 | Pfeilschifter et al. |
| 11,228,255 B2 | 1/2022 | Spesser et al. |

(Continued)

FOREIGN PATENT DOCUMENTS

| | | | |
|---|---|---|---|
| DE | 102015207413 A1 | 10/2016 | ............. B60L 11/18 |
| DE | 102015219863 A1 | 10/2016 | ............. B60L 11/18 |

(Continued)

OTHER PUBLICATIONS

English Machine Translation of DE102019209654 A1 (Year: 2019).*

(Continued)

*Primary Examiner* — Gabriel Agared
(74) *Attorney, Agent, or Firm* — Slayden Grubert Beard PLLC (57) ABSTRACT

The disclosure relates to a traction network for a motor vehicle, wherein the traction network comprises at least one high-voltage battery, an inverter, an electric machine, a DC charging terminal, and an AC charging terminal, wherein a rectifier and a DC/DC converter are arranged between the AC charging terminal and the high-voltage battery, wherein a DC/DC converter is arranged between the high-voltage battery and the inverter.

13 Claims, 10 Drawing Sheets

(51) Int. Cl.
*H02M 3/335* (2006.01)
*H02M 7/487* (2007.01)

(56) References Cited

U.S. PATENT DOCUMENTS

| | | | |
|---|---|---|---|
| 2013/0334879 A1* | 12/2013 | Ido | B60R 16/033 |
| | | | 307/10.1 |
| 2014/0247019 A1 | 9/2014 | Park | |
| 2018/0001775 A1* | 1/2018 | Enthaler | B60L 50/66 |
| 2019/0126761 A1 | 5/2019 | Verbridge | |
| 2019/0283625 A1* | 9/2019 | Eriksson | H02J 7/0024 |
| 2019/0291584 A1* | 9/2019 | Ren | B61C 3/02 |
| 2019/0359074 A1* | 11/2019 | Kume | B60K 17/356 |
| 2020/0280267 A1* | 9/2020 | Restrepo | H02M 7/53871 |
| 2020/0298722 A1 | 9/2020 | Smolenaers | |
| 2020/0331355 A1 | 10/2020 | Choi et al. | |
| 2021/0175837 A1* | 6/2021 | Wang | B60L 3/0046 |
| 2021/0316621 A1 | 10/2021 | Slepchenkov et al. | |

FOREIGN PATENT DOCUMENTS

| | | | | |
|---|---|---|---|---|
| DE | 102016213061 A1 | 12/2016 | | B60L 11/18 |
| DE | 102015010713 A1 | 2/2017 | | B60L 11/18 |
| DE | 102016206945 A1 | 10/2017 | | B60L 11/18 |
| DE | 102018203514 A1 | 9/2019 | | B60L 53/20 |
| DE | 102019106485 A1 | 9/2020 | | B60L 53/14 |
| DE | 102019209654 A1 * | 10/2020 | | B60L 50/60 |
| DE | 102019207045 A1 | 11/2020 | | B60L 53/24 |
| DE | 102019117345 A1 | 12/2020 | | B60L 50/60 |
| WO | 2020/190265 A1 | 9/2020 | | H02J 3/38 |

OTHER PUBLICATIONS

Krug, Dietmar, "Vergleichende Untersuchungen von Mehrpunkt-Schaltungstopologien mit zentralem Gleichspannungszwischenkreis für Mittelspannungsanwendungen," URL: https://d-nb.info/1123931275/34, 195 pages (German w/ English abstract/introduction), Jun. 28, 2016.

Wunder, Bernd, "Ladetechniken für Elektrofahrzeuge," URL: https://www.bs1-bt.de/images/Technikerschule/Download/02_2018-01-17_-_Ladetechniken_f%C3%BCr_EV_-_BW_-_final_dt.pdf, 104 pages (German w/ English translation).

German Office Action, Application No. 102022202154.1, 9 pages.

* cited by examiner

TRACTION NETWORK FOR A MOTOR VEHICLE

CROSS-REFERENCE TO RELATED APPLICATIONS

This application claims priority to German Patent Application No. DE 10 2022 202 154.1, filed on Mar. 3, 2022 with the German Patent and Trademark Office. The contents of the aforesaid Patent Application are incorporated herein for all purposes.

TECHNICAL FIELD

The invention relates to a traction network for a motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The typical setup of a traction network consists of a traction battery, an inverter, and an electric machine. Many different topologies are known as to how the individual components of a traction network of this kind are set up. In order to reduce the currents, an attempt is made to work with voltages that are as high as possible in the vehicle. For example, traction networks are known in which the nominal voltage of the traction battery is 800 V. This leads to problems with the dielectric strength of the semiconductor switches, and therefore three-level inverters have been proposed for traction networks of this kind, as described for example in DE 10 2016 206 945 A1. Another problem is posed by the inconsistent charging infrastructure, where 400 V and 800 V DC charging columns are available. Depending on the topology used, the maximum charging power cannot be fully exploited or the circuitry is too costly.

Furthermore, there is often the desire to charge with an AC voltage. In this case, a rectifier which converts the AC voltage into a DC voltage is arranged between the AC charging terminal and the high-voltage battery. A DC/DC converter may also be provided, which adapts the rectified voltage to the voltage level of the high-voltage battery.

SUMMARY

A need exists to provide a traction network in which the operating point adjustment of an electric machine is improved.

The need is addressed by a traction network having the features of the independent claim(s). Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a traction network for a motor vehicle comprises at least one high-voltage battery, an inverter, an electric machine, a DC charging terminal, and an AC charging terminal, wherein a rectifier and a DC/DC converter is arranged between the AC charging terminal and the high-voltage battery, wherein a DC/DC converter is arranged between the high-voltage battery and the inverter. Said DC/DC converter makes it possible to operate the electric machine at optimized operating points, regardless of the current voltage level of the high-voltage battery. The optimization may take place, for example, with regard to the efficiency or drive power.

In some embodiments, the DC/DC converter between the AC voltage terminal and the high-voltage battery and the DC/DC converter between the high-voltage battery and the inverter is configured as a common DC/DC converter, which saves on components, which in turn saves on costs and installation space. Another benefit is that said one common DC/DC converter can be arranged in a compact manner on a printed circuit board with an appropriate cooling means. Since the DC/DC converter is designed to match the inverter in terms of power, the inverter is sufficiently dimensioned for AC charging. If the rectifier is designed so as to be accordingly scalable, such that it can process a charging power of, for example, 11, 22, or 43 kW, the DC/DC converter does not have to be adapted further, since it is typically designed for higher powers for the inverter. Therefore, the need for change when scaling the AC charging power is reduced to adapting the rectifier.

In some embodiments, the high-voltage battery comprises two battery units having the same nominal voltage as well as a switching circuit, wherein the switching circuit is configured such that the two battery units can either be connected in series or in parallel. For example, the nominal voltage is 400 V, and therefore the high-voltage battery can be charged with 400 V or 800 V DC, wherein 800 V is available in the traction network for the drive, and therefore the required currents are reduced. By means of appropriate circuitry, it can be ensured that the two battery units are equalized in terms of voltage before they are connected in parallel in order to reduce equalizing currents.

In some embodiments, the DC/DC converter is configured as a bidirectional step-up/step-down converter, which allows for the highest degree of freedom for setting the operating point of the electric machine. However, this increases the circuitry outlay.

In some embodiments, the DC/DC converter is configured as a bidirectional step-up converter, and therefore the voltage of the high-voltage battery is constantly stepped up.

Alternatively, the DC/DC converter is configured as a bidirectional step-down converter.

In some embodiments, the rectifier is configured as a unidirectional Vienna rectifier, which is very robust, requires few components, and is easy to scale. Alternatively, the rectifier is configured as a bidirectional neutral point clamped rectifier, and therefore power can also be fed back into the external power grid. Alternatively, the rectifier is designed as a Weissach rectifier, as described in DE 10 2019 106 485 A1. This allows for simple adaptation to different external AC charging structures.

In some embodiments, the DC/DC converter comprises a switching circuit which is configured such that, in a first switching position, the DC/DC converter is connected to the input terminals of the inverter and, in a second switching position, said DC/DC converter is connected to the output terminals of the rectifier. This also may ensure that, during charging of the high-voltage battery, the electric machine is not energized and thus no undesired drive torque can be generated.

In some embodiments, the switching circuit of the high-voltage battery comprises a neutral point, wherein the neutral point is connected to a neutral point of the DC/DC converter, wherein the inverter is configured as a 3L inverter, wherein a neutral point of the DC/DC converter is connected to a neutral point of the inverter.

In some embodiments, switching elements of the switching circuit of the high-voltage battery are configured as relays and/or switching elements of the switching circuit of the DC/DC converter are designed as relays, such that galvanic isolation can be achieved in each case.

The invention will be explained in the following in more detail with reference to various exemplary embodiments.

In the exemplary embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

Figure 1:
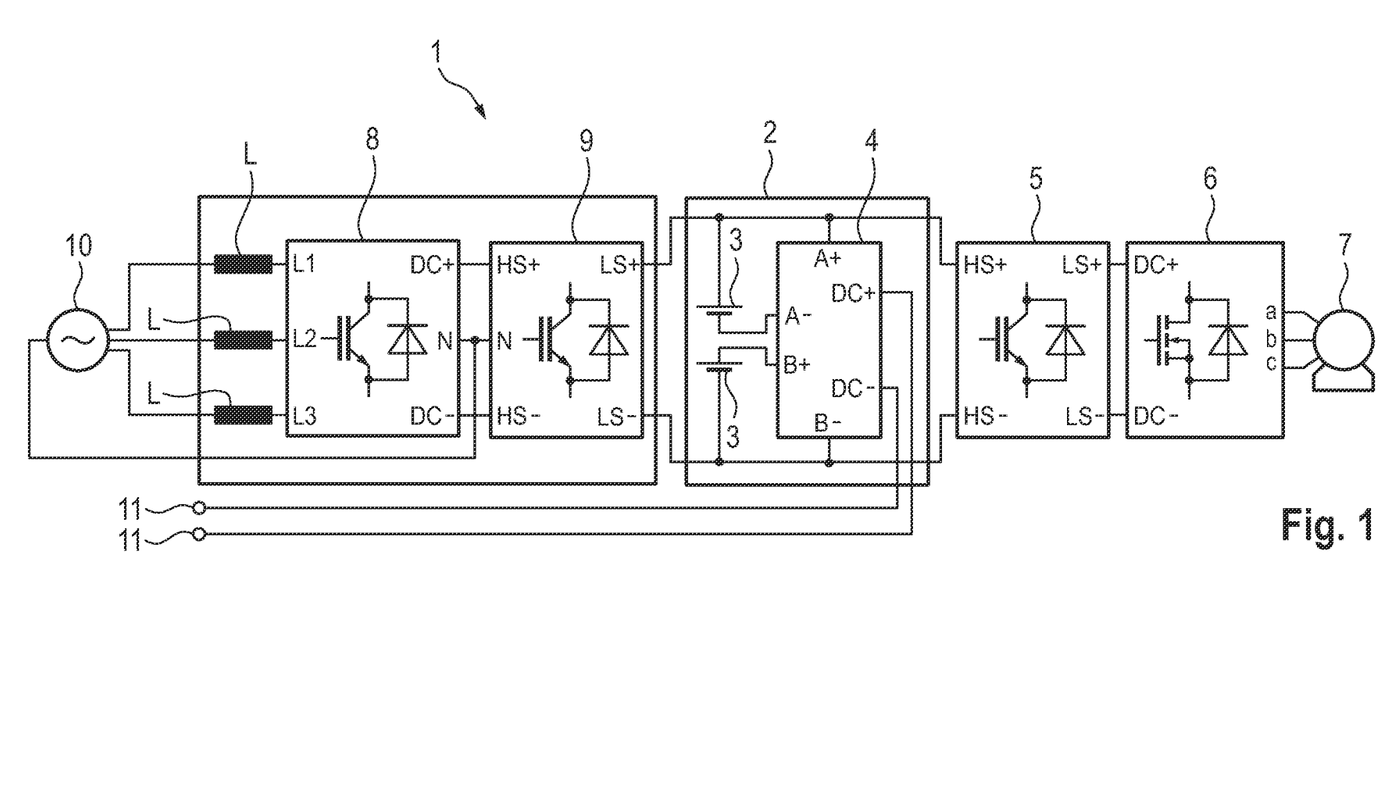
FIG. 1 shows a schematic circuit arrangement of a traction network in a first embodiment.

In FIG. 1, a traction network 1 is schematically represented in a first embodiment. The traction network 1 comprises a high-voltage battery 2, which comprises two battery units 3 and a switching circuit 4. Furthermore, the traction network 1 comprises a DC/DC converter 5, an inverter 6, an electric machine 7, a rectifier 8, and another DC/DC converter 9. The rectifier 8 comprises three inputs L1-L3, at which one inductor L is arranged in each case, the other ends of which form an AC voltage terminal for an external AC voltage source 10, wherein a neutral conductor of the AC voltage source 10 is led to a connection between the neutral points of the rectifier 8 and the DC/DC converter 9. The DC/DC converter 9 is for example a step-up converter, which steps up the rectified voltage at the output of the rectifier to the voltage of the high-voltage battery 2. Furthermore, the traction network 1 comprises DC charging terminals 11, which are connected to the switching circuit 4 of the high-voltage battery 2. The two battery units 3 can either be connected in series or in parallel by means of the switching circuit 4. Furthermore, the switching circuit 4 may comprise means, i.e., circuitry, for equalizing voltage differences between the battery units 3. If, for example, the battery units 3 have a nominal voltage of 400 V, charging can take place at the DC charging terminals 11 with either 400 V or 800 V. The circuitry for equalizing the voltage differences reduces equalizing currents in the case of parallel connection. This voltage equalization can take place in various ways, for example by means of cell balancing. By means of the DC/DC converter 5, a desired operating point can be set at the electric machine 7 by means of the inverter 6 regardless of the voltage of the high-voltage battery 2. The DC/DC converter 5 is, in this case, designed to be bidirectional in order to feed recuperation energy back into the high-voltage battery 2. For example, the DC/DC converter 5 is configured as a step-up/step-down converter and can therefore step the high-voltage battery voltage up or down, depending on the operating point voltage to be set at the electric machine 7. The traction network 1 shown is therefore very flexible with regard to the external charging voltages and also very flexible with regard to the operating point adjustment at the electric machine 7. However, the circuitry outlay is not inconsiderable.

Figure 2:
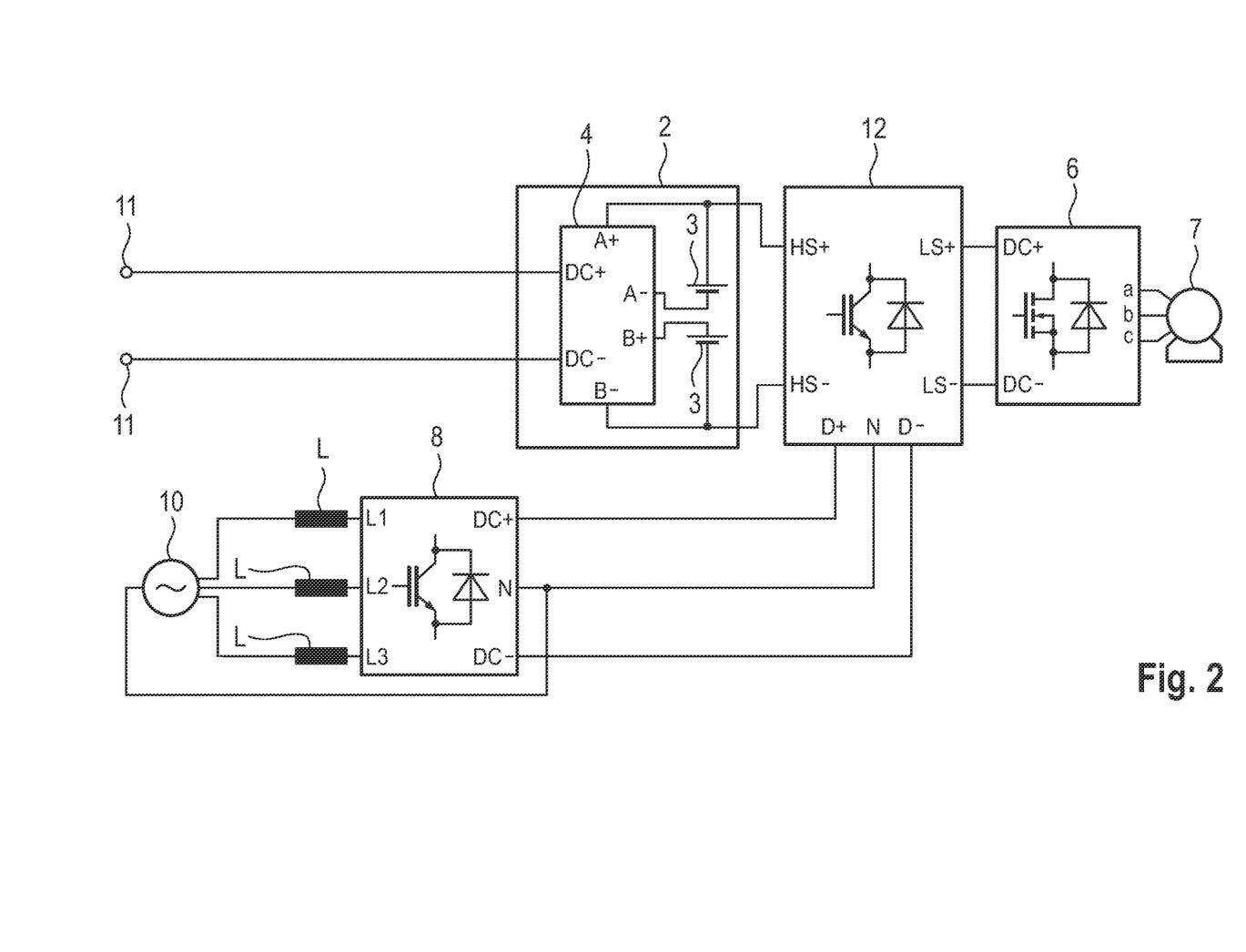
FIG. 2 shows a schematic circuit arrangement of a traction network in a second embodiment.

FIG. 2 shows a traction network 1 in which the DC/DC converter 9 is integrated in the DC/DC converter 5 as a common DC/DC converter 12. This has multiple benefits. Firstly, it saves on components, costs, and installation space. Another benefit is that, when a charging power of the AC voltage source 10 is adapted, only the rectifier 8 still has to be adapted in terms of power, whereas the DC/DC converter 12 is already sufficiently dimensioned for all conventional power classes up to 43 kW. Another benefit is the cooling. The power losses in the rectifier 8 are generally so small that simple air cooling is sufficient, whereas the DC/DC converter 12 and, if applicable, the inverter 6 have a liquid cooling means, however this can be designed so as to be spatially very compact.

Figure 3:
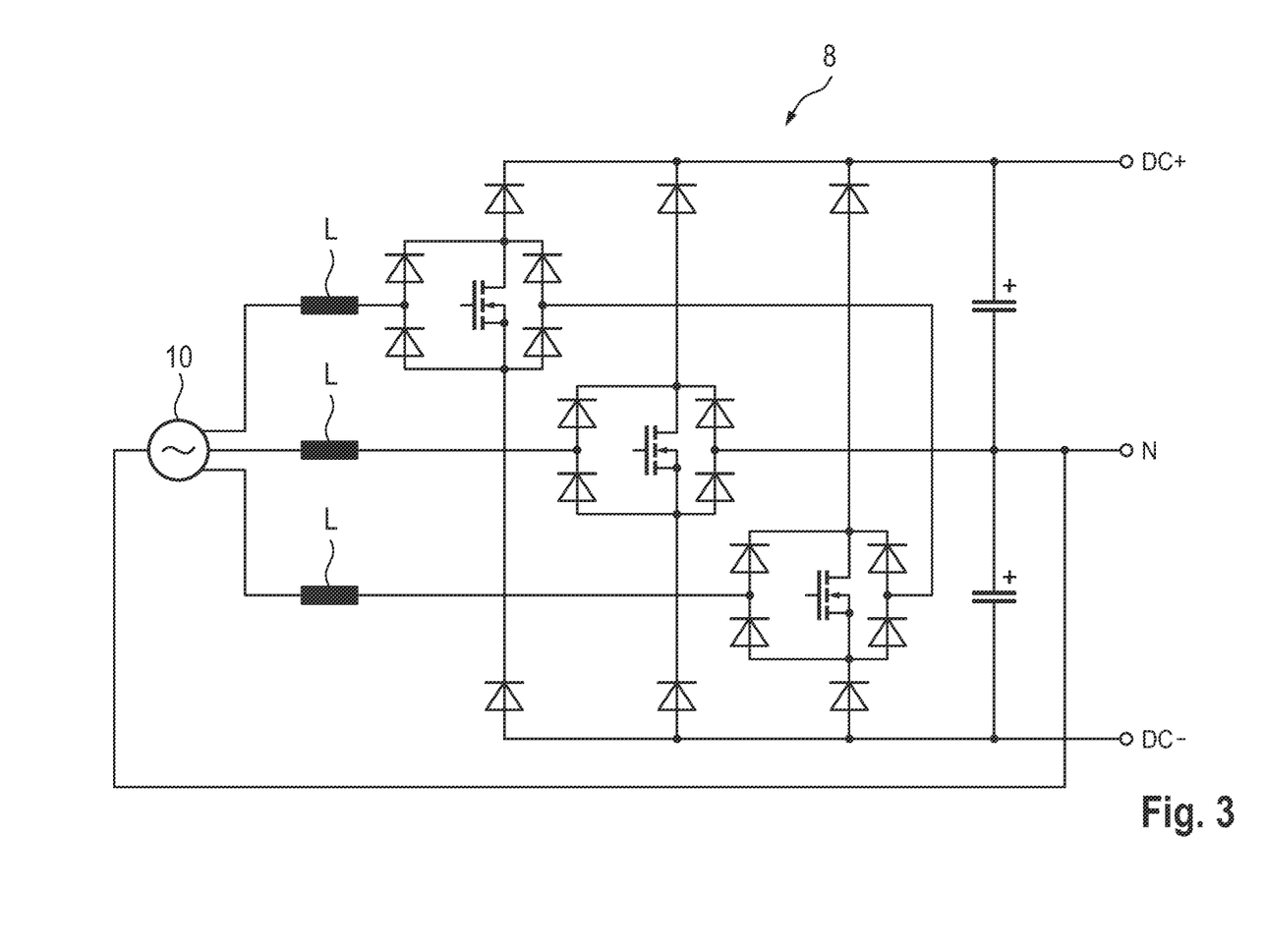
FIG. 3 shows a schematic circuit arrangement of a Vienna rectifier.
Figure 4:
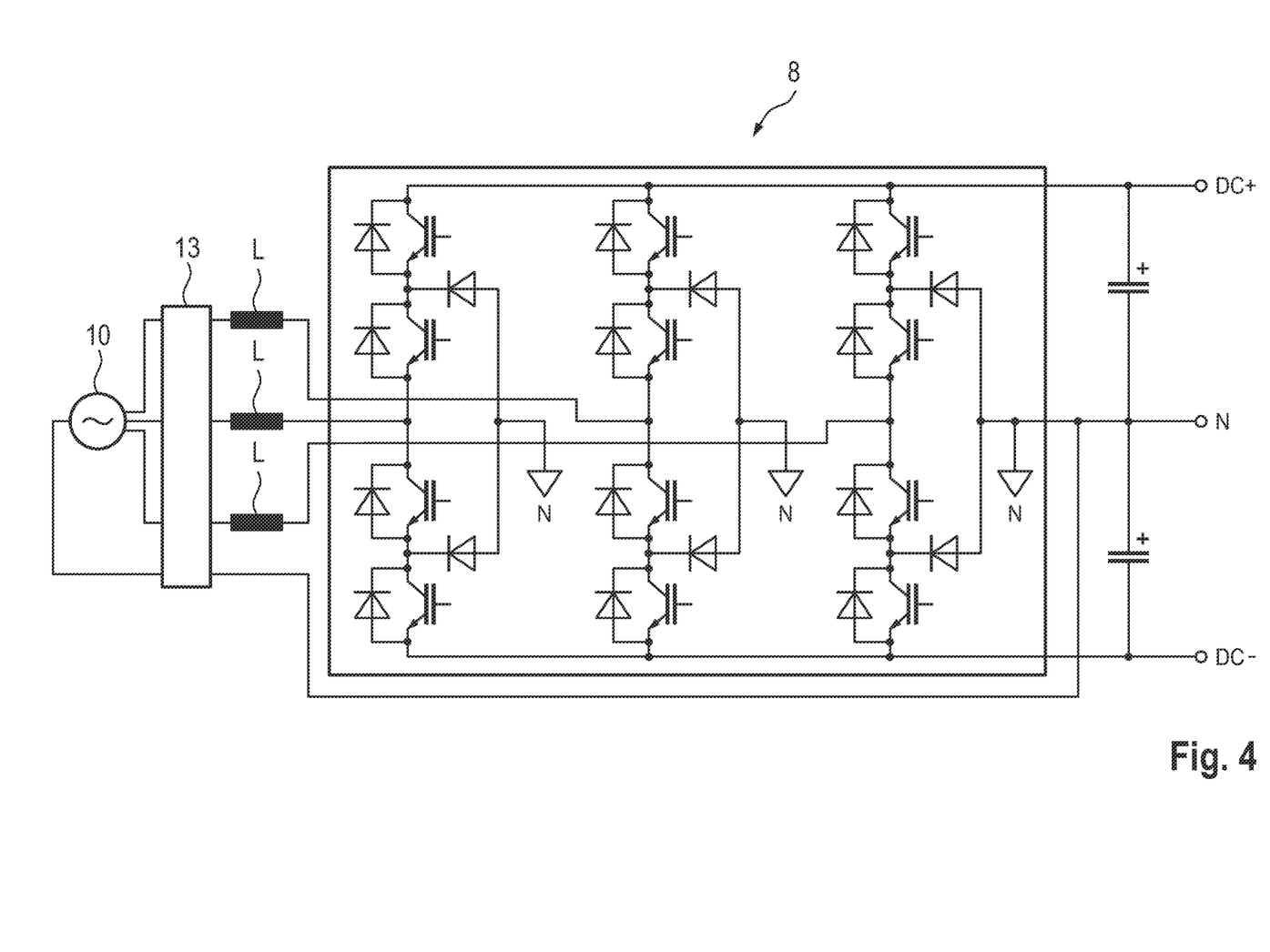
FIG. 4 shows a schematic circuit arrangement of a bidirectional NPC rectifier.

In the simplest case, the rectifier 8 can for example be configured as a unidirectional Vienna rectifier, as shown in FIG. 3. In this case, power factor correction (PFC) is integrated in the rectifier 8. Alternatively, the rectifier 8 can be designed as a bidirectional NPC rectifier, such that the traction network can also feed power into the AC voltage network. An NPC rectifier of this kind is shown in FIG. 4, wherein an AC voltage filter 13 may additionally be present at the input.

Figure 5:
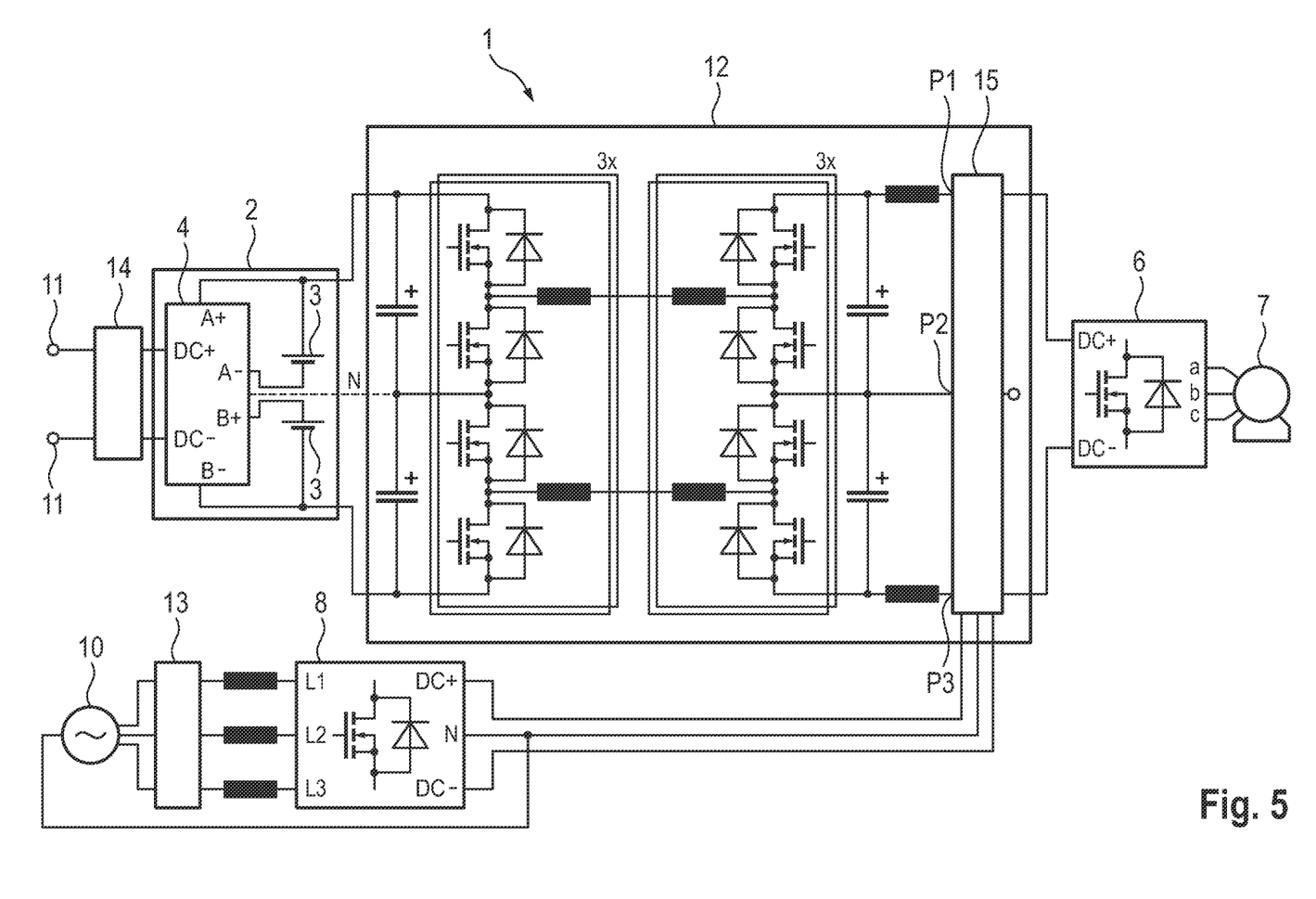
FIG. 5 shows a schematic circuit arrangement of a traction network having a step-up/step-down converter.

FIG. 5 shows the traction network 1 according to FIG. 2, wherein the AC voltage filter 13 and a DC voltage filter 14 are additionally shown. It also shows a possible circuit for the DC/DC converter 12 by means of which the DC/DC converter 12 can be operated both as a step-up converter and as a step-down converter. It is further indicated that the circuit shown is present in parallel a total of three times in order to divide the power. However, this is not mandatory. For example, more or less than three circuits may be provided. It is further indicated that a neutral point of the high-voltage battery 2 is connected to a neutral point of the DC/DC converter. Furthermore, a switching circuit 15 in the DC/DC converter 12 is shown. Switching elements for example are configured as relays are arranged in the switching circuit 15. During charging with AC voltage, the inverter 6 can be isolated from the DC/DC converter 12 by means of the switching elements, such that the outputs DC+, N, and DC− of the rectifier 8 are connected to the points P1-P3 of the DC/DC converter 12.

Figure 6:
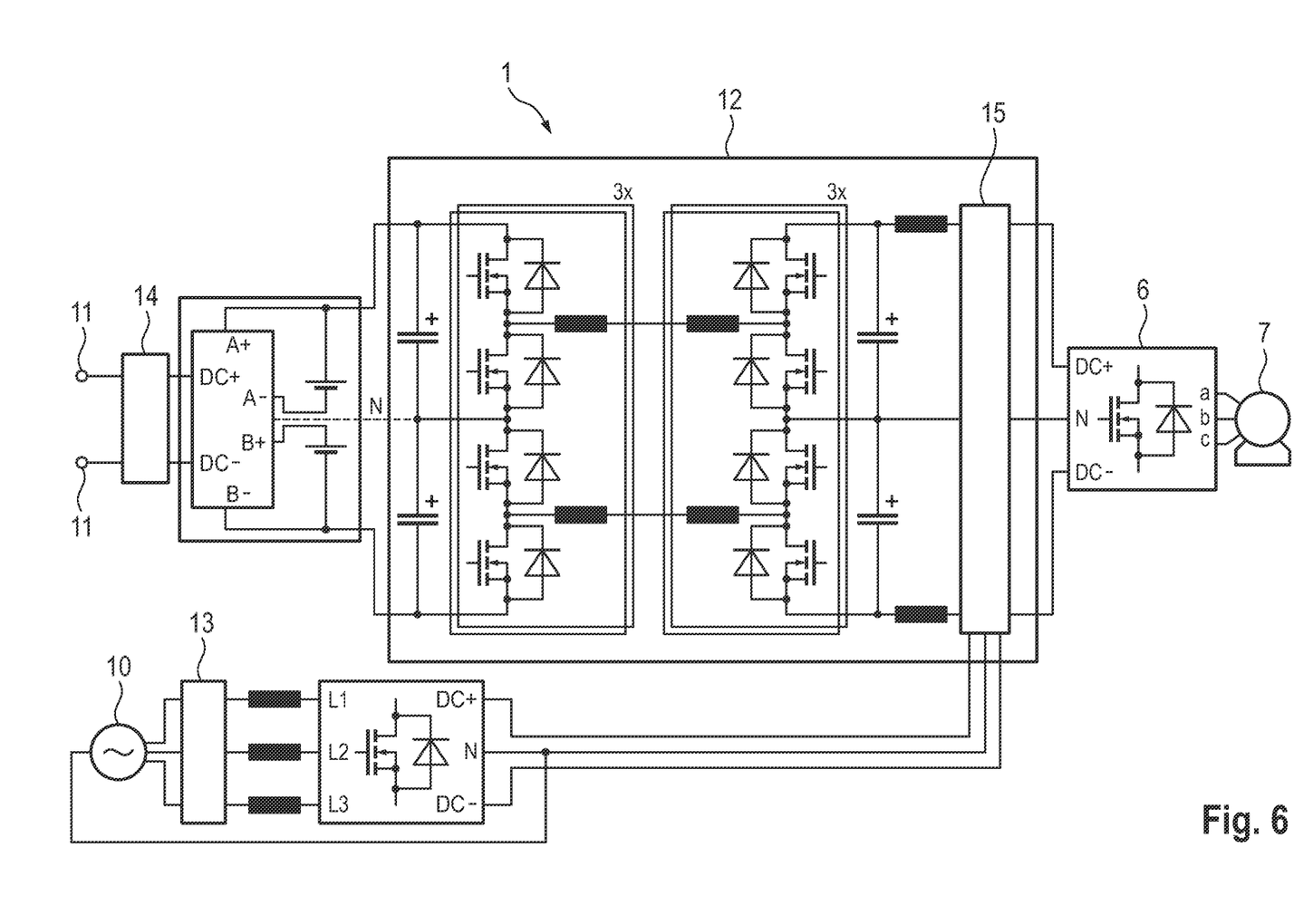
FIG. 6 shows a schematic circuit arrangement of a traction network having a 3L inverter.

FIG. 6 shows an alternative embodiment of the traction network 1, wherein the substantial difference with respect to FIG. 5 is that the inverter 6 is configured as a three-level inverter or rather 3L inverter, wherein a neutral point N of the high-voltage battery 2 is looped through to the inverter 6 via the DC/DC converter 12.

Figure 7:
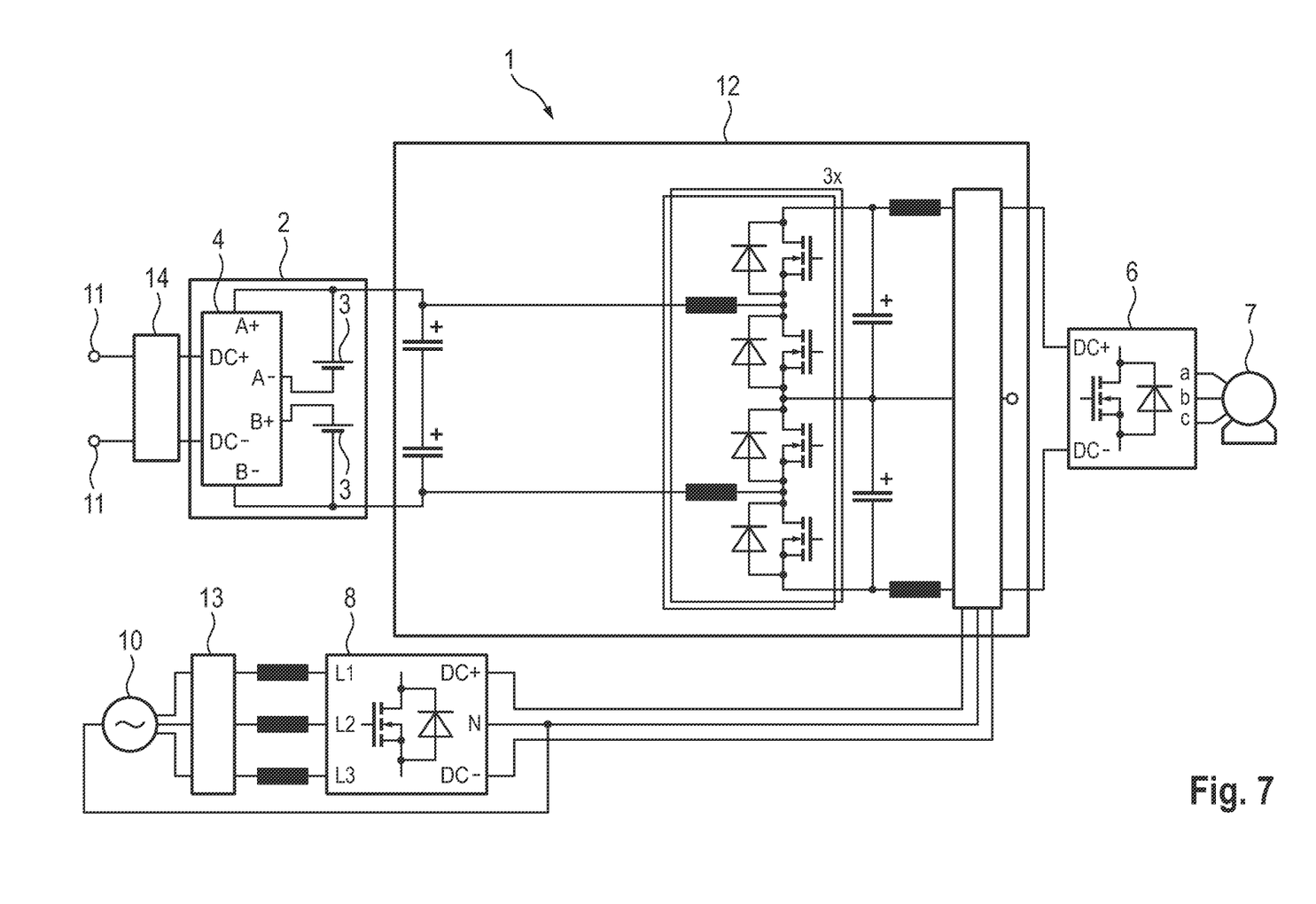
FIG. 7 shows a schematic circuit arrangement of a traction network having a step-up converter in a first embodiment.

FIG. 7 shows another alternative embodiment for a traction network 1, wherein the DC/DC converter 12 is configured as a step-up converter; the battery voltage of the high-voltage battery 2 can only ever be stepped up. Although this somewhat reduces the adjustment options for the operating point for the electric machine 7, it is sufficient for most application scenarios.

Figure 8:
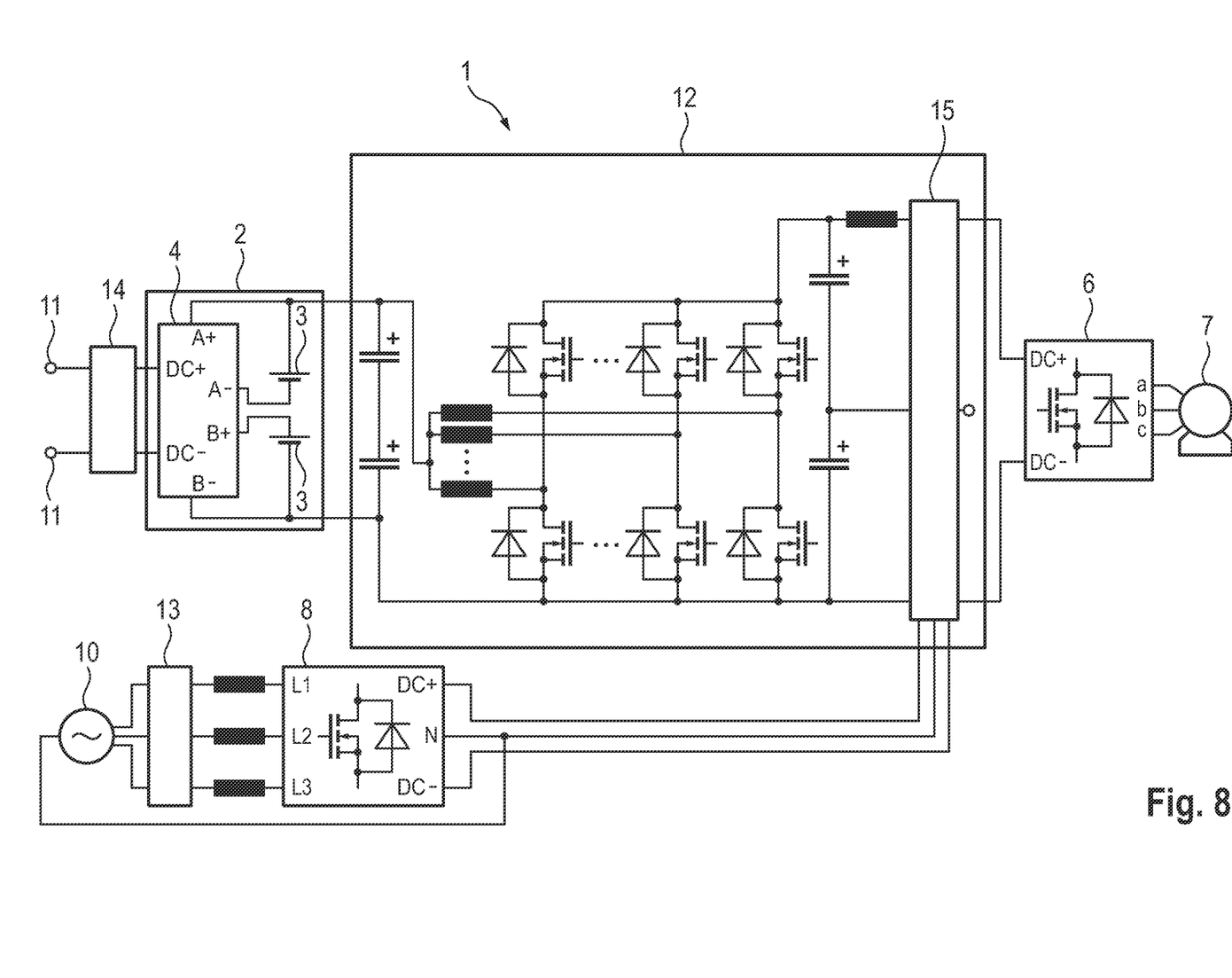
FIG. 8 shows a schematic circuit arrangement of a traction network having a step-up converter in a second embodiment.

FIG. 8 shows an alternative embodiment for the step-up converter, which can very easily be scaled in order to thus divide the power. Furthermore, the number of components is, on average, somewhat less than in the embodiment according to FIG. 7, but the transistors must have a higher dielectric strength.

Figure 9:
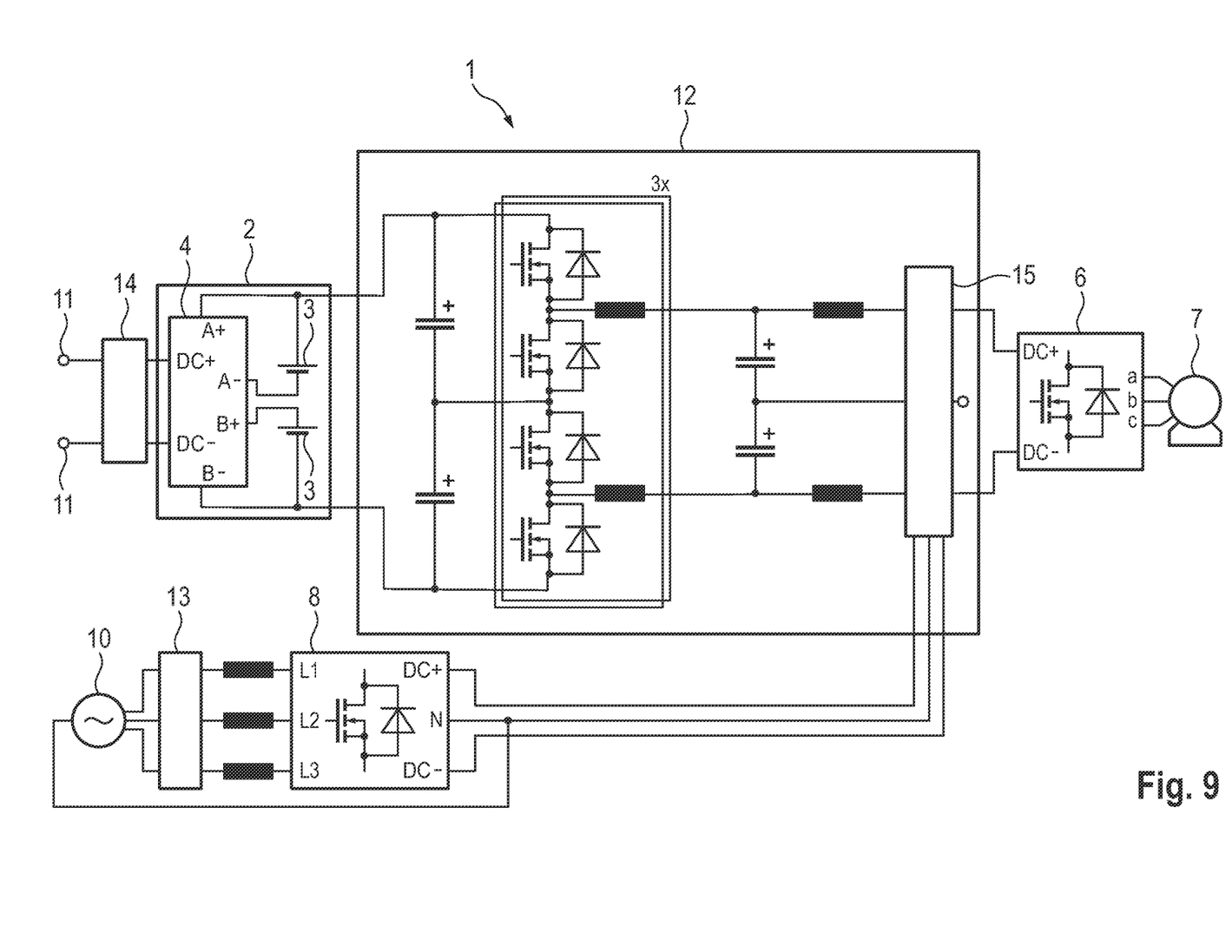
FIG. 9 shows a schematic circuit arrangement of a traction network having a step-up converter in a third embodiment.
Figure 10:
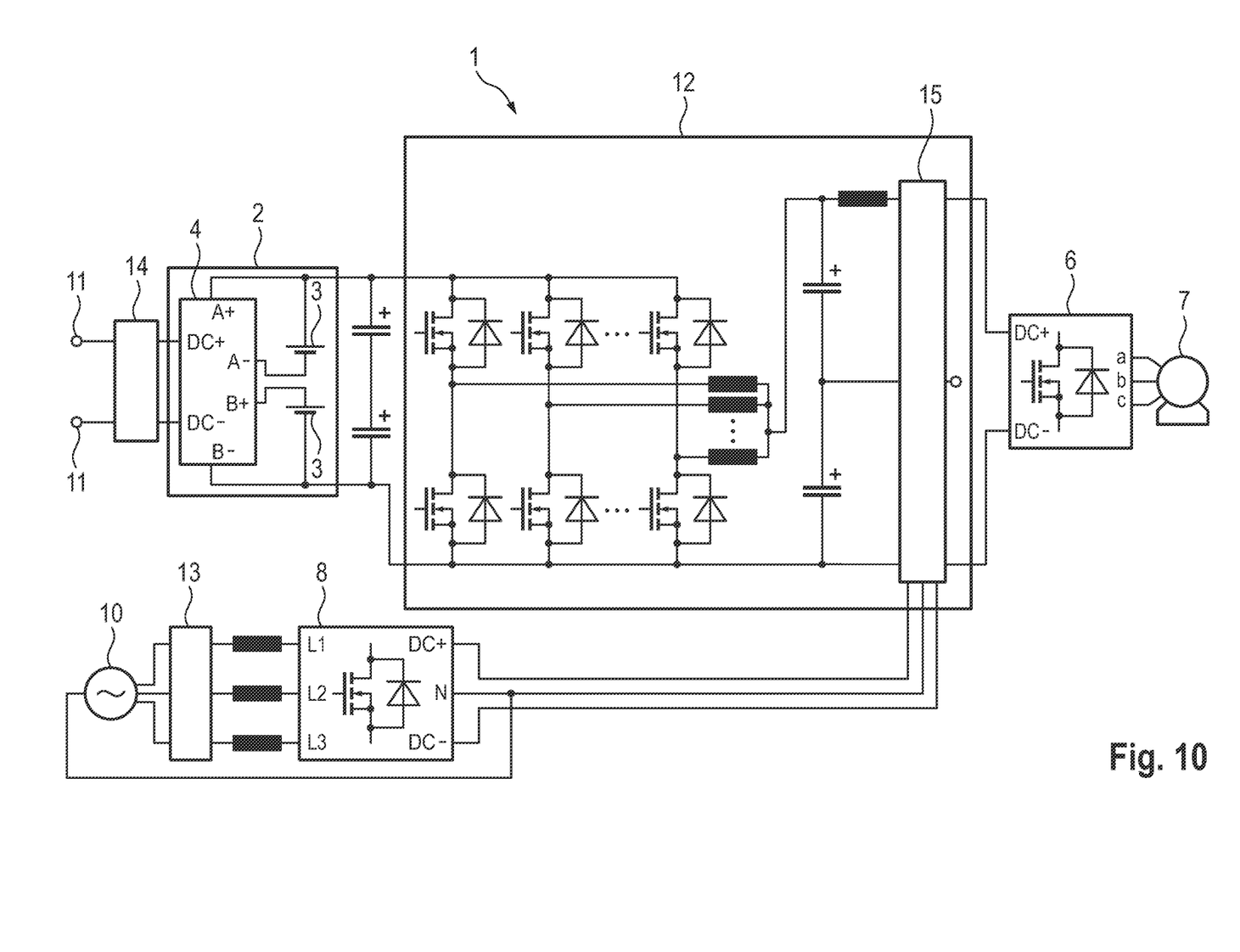
FIG. 10 shows a schematic circuit arrangement of a traction network having a step-up converter in a fourth embodiment.

FIG. 9 and FIG. 10 show further alternative designs for the step-up converter.

LIST OF REFERENCE NUMERALS

1 Traction network
2 High-voltage battery
3 Battery unit
4 Switching circuit
5 DC/DC converter
6 Inverter
7 Electric machine
8 Rectifier
9 DC/DC converter
10 AC voltage source
11 DC charging terminal
12 DC/DC converter
13 AC voltage filter
14 DC voltage filter
15 Switching circuit The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A traction network for a motor vehicle, wherein the traction network comprises at least one high-voltage battery, an inverter, an electric machine, a common DC/DC converter, a DC charging terminal, and an AC charging terminal; wherein a rectifier is arranged between the AC charging terminal and the high-voltage battery; wherein
   the common DC/DC converter comprises a switching circuit which is configured such that, in a first switching position for driving, the DC/DC converter is connected to input terminals of the inverter and isolated from output terminals of the rectifier and, in a second switching position for charging, said DC/DC converter is connected to the output terminals of the rectifier while being isolated from the input terminals of the inverter.

2. The traction network of claim 1, wherein the high-voltage battery comprises two battery units having the same nominal voltage as well as a switching circuit, wherein the switching circuit is configured to connect the two battery units either in series or in parallel.

3. The traction network of claim 2, wherein the switching circuit of the high-voltage battery comprises a neutral point, wherein the neutral point is connected to a neutral point of the DC/DC converter, wherein the inverter is designed as a 3L inverter, wherein a neutral point of the DC/DC converter is connected to a neutral point of the inverter.

4. The traction network of claim 2, wherein switching elements of the switching circuit of the high-voltage battery are configured as relays and/or switching elements of the switching circuit of the DC/DC converter are designed as relays.

5. The traction network of claim 2, wherein the DC/DC converter is configured as a bidirectional step-up/step-down converter.

6. The traction network of claim 2, wherein the DC/DC converter is configured as a bidirectional step-up converter.

7. The traction network of claim 2, wherein the DC/DC converter is configured as a bidirectional step-down converter.

8. The traction network of claim 2, wherein the rectifier is configured as a unidirectional Vienna rectifier or as a bidirectional neutral point clamped rectifier or as a Weissach rectifier.

9. The traction network of claim 1, wherein the DC/DC converter is configured as a bidirectional step-up/step-down converter.

10. The traction network of claim 9, wherein the rectifier is configured as a unidirectional Vienna rectifier or as a bidirectional neutral point clamped rectifier or as a Weissach rectifier.

11. The traction network of claim 1, wherein the DC/DC converter is configured as a bidirectional step-up converter.

12. The traction network of claim 1, wherein the DC/DC converter is configured as a bidirectional step-down converter.

13. The traction network of claim 1, wherein the rectifier is configured as a unidirectional Vienna rectifier or as a bidirectional neutral point clamped rectifier or as a Weissach rectifier.

* * * * *